United States Patent
Choyi et al.

(10) Patent No.: US 12,177,675 B2
(45) Date of Patent: *Dec. 24, 2024

(54) SYSTEMS AND METHODS FOR USING A UNIQUE ROUTING INDICATOR TO CONNECT TO A NETWORK

(71) Applicant: Verizon Patent and Licensing Inc., Basking Ridge, NJ (US)

(72) Inventors: Vinod Kumar Choyi, Conshohocken, PA (US); Sudhakar Reddy Patil, Flower Mound, TX (US); Robert Avanes, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

This patent is subject to a terminal disclaimer.

(21) Appl. No.: 17/819,119

(22) Filed: Aug. 11, 2022

(65) Prior Publication Data
US 2022/0386130 A1  Dec. 1, 2022

Related U.S. Application Data

(63) Continuation of application No. 16/988,988, filed on Aug. 10, 2020, now Pat. No. 11,432,158.

(51) Int. Cl.
*H04W 12/72* (2021.01)
*H04W 8/18* (2009.01)
*H04W 12/02* (2009.01)
*H04W 12/06* (2021.01)
*H04W 40/24* (2009.01)
*H04W 60/00* (2009.01)

(52) U.S. Cl.
CPC ............ *H04W 12/72* (2021.01); *H04W 8/18* (2013.01); *H04W 12/02* (2013.01); *H04W 12/06* (2013.01); *H04W 40/24* (2013.01); *H04W 60/00* (2013.01)

(58) Field of Classification Search
CPC ....... H04W 12/72; H04W 8/18; H04W 12/02; H04W 12/06; H04W 40/24; H04W 60/00; H04L 2463/082; H04L 63/0892
See application file for complete search history.

(56) References Cited

U.S. PATENT DOCUMENTS

| | | | |
|---|---|---|---|
| 11,432,158 B2 * | 8/2022 | Choyi | H04W 8/18 |
| 2020/0204985 A1 * | 6/2020 | An | H04W 4/60 |
| 2021/0051468 A1 * | 2/2021 | Baskaran | H04W 48/16 |
| 2021/0195409 A1 * | 6/2021 | Zhang | H04W 12/72 |

(Continued)

*Primary Examiner* — Angelica Perez

(57) ABSTRACT

In some implementations, a device of a network may receive, from a user equipment (UE), a request associated with enabling the UE to access a network, wherein the request includes a first routing indicator. The device may identify an authentication manager, of the network, that is mapped to the first routing indicator in an entry of a routing table of the network. The device may route the request to the authentication manager of the network to permit the authentication manager to authenticate the UE. The device may purge, based on the request being routed to the authentication manager, the entry to remove the first routing indicator from the routing table. The device may store, after purging the entry, a second routing indicator in the entry to map the second routing indicator to the authentication manager, wherein the second routing indicator is different from the first routing indicator.

20 Claims, 11 Drawing Sheets

(56) References Cited

U.S. PATENT DOCUMENTS

| | | | |
|---|---|---|---|
| 2021/0320788 A1* | 10/2021 | Kang | H04L 9/0825 |
| 2022/0060896 A1* | 2/2022 | Wu | H04L 9/0844 |
| 2022/0159460 A1* | 5/2022 | Ben Henda | H04W 12/041 |
| 2023/0262453 A1* | 8/2023 | Baskaran | H04W 12/041 |
| | | | 726/1 |

* cited by examiner

SYSTEMS AND METHODS FOR USING A UNIQUE ROUTING INDICATOR TO CONNECT TO A NETWORK

RELATED APPLICATION

This application is a continuation of U.S. patent application Ser. No. 16/988,988, entitled "SYSTEMS AND METHODS FOR USING A UNIQUE ROUTING INDICATOR TO CONNECT TO A NETWORK," filed Aug. 10, 2020 (now U.S. Pat. No. 11,432,158), which is incorporated herein by reference in its entirety.

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
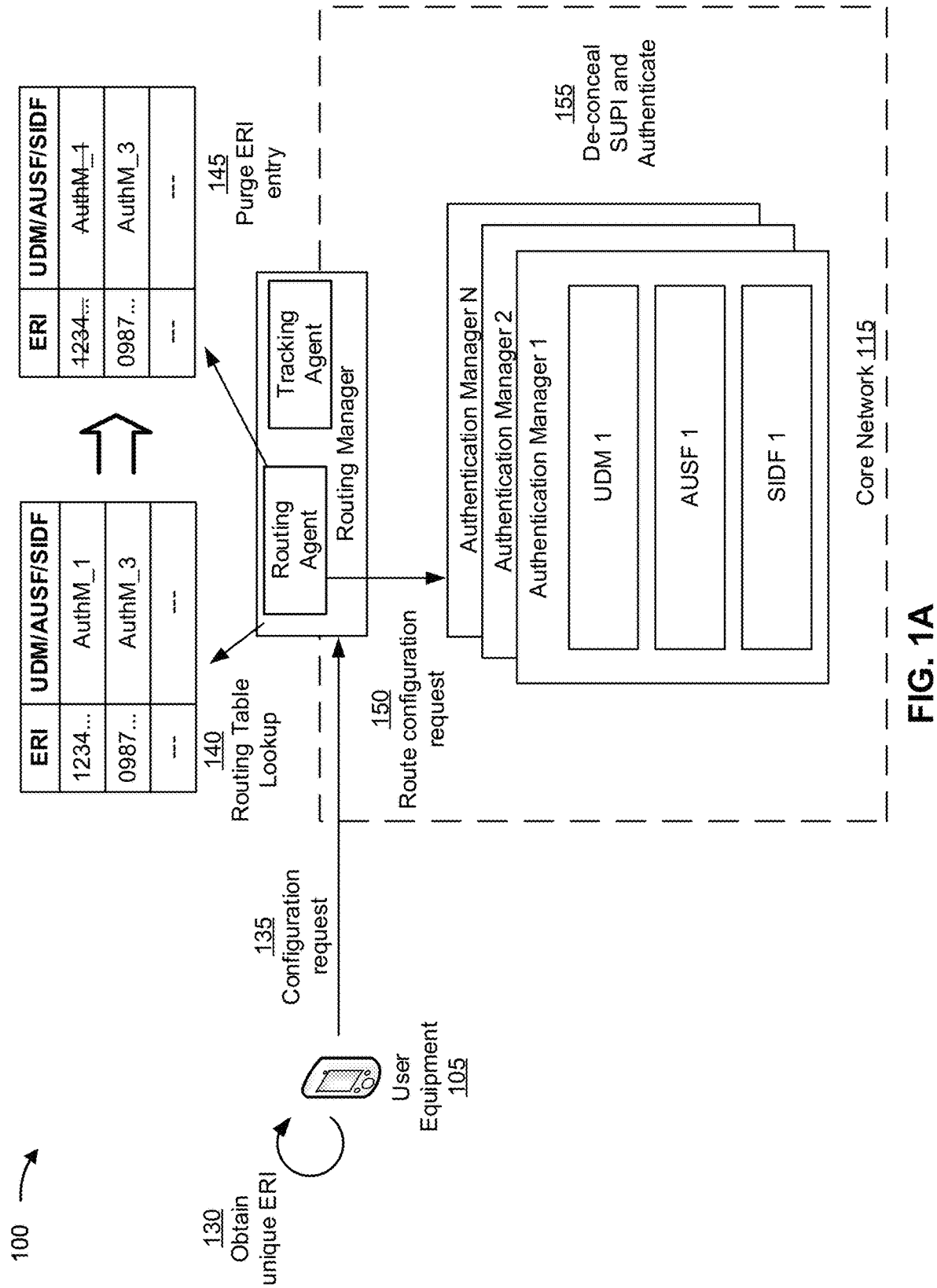
FIGS. 1A-1C are diagrams of an example associated with using a unique routing indicator to connect to a network.

The following detailed description of example implementations refers to the accompanying drawings. The same reference numbers in different drawings may identify the same or similar elements.

A routing identifier is used in a request to establish a connection between a user equipment (UE) and a network (e.g., a 5G/New Radio (5G/NR) network, a $4^{th}$ generation Long-Term Evolution (4G/LTE) network, and/or the like). Such a request may be a request, a registration request or the like for establishing an initial connection between the UE and the network (e.g., to activate a subscription associated with the UE to permit the UE to communicate via the network) and/or a reconnection with the network (e.g., after the UE is disconnected from the network, a reconnection associated with reregistering the UE with the network according to a policy of the network, and/or the like). The routing indicator indicates which authentication manager of the network is to identify (e.g., de-conceal) and authenticate the UE and/or allow the UE to connect to the network. According to previous techniques, a routing indicator can be fixed for a UE (e.g., the UE always uses the routing indicator to establish a connection to the network) and shared across multiple UEs that are configured to communicate via the network. Previously, a routing indicator could be one of a relatively low quantity of possible identifiers (e.g., 10,000 identifiers or less).

Because the routing indicators are a fixed set of such a low quantity of identifiers, a malicious actor ((e.g., a fraudulent user of the network), using a maliciously configured UE, can disrupt operating capabilities of a network by repeatedly sending malicious configuration or registration requests to the network using one of the routing indicators. For example, the malicious requests may include counterfeit subscription permanent identifiers (SUPIs) and/or a counterfeit subscription concealed identifier (SUCI), that would result in unsuccessful identification and authentication of the maliciously configured UE (e.g., because the maliciously configured UE is not configured to communicate with the network). However, resources of a routing manager of the network would be consumed and/or wasted when receiving, processing, and/or routing the malicious requests, and resources of the authentication manager would be consumed and/or wasted attempting to decrypt a counterfeit SUCI that cannot be de-concealed, or attempting to authenticate a counterfeit SUPI that is not associated with a UE that is authorized to communicate via the network. Furthermore, depending on the quantity and/or frequency of the maliciously configured UE (and/or other maliciously configured UEs) sending the malicious requests, the network be unable to receive, process, and/or authenticate authentic requests from authentic UEs that are authorized to communicate via the network, resulting in denial of service to the authentic UEs.

According to some implementations described herein, a UE and a network are configured to use a routing indicator that is specific to the UE and specific to a request associated with the UE to reduce and/or prevent malicious actors from attempting to disrupt a network using routing indicators. As described herein, the UE may be assigned a unique routing indicator that is shared with the network. After using the unique routing indicator to connect to the network, the UE and the network may independently generate a same new routing indicator for a subsequent request from the UE. For example, the UE and the network may be configured to generate the new routing indicator according to a same encryption technique that uses a same set of inputs (e.g., the previous routing indicator, the SUPI of the UE, and/or the like). In some implementations, a length of the unique routing indicator may be longer (e.g., shown as and referred to herein as an extended routing indicator (ERI)) than the routing indicators of the previously fixed set of routing indicators, allowing for a much greater number of unique indicators (e.g., over 4 billion) and reducing the potential for a malicious actor to use an unused routing indicator in a malicious request.

In this way, the UE and the network, using unique routing indicators for the UE and/or for requests of the UE, may reduce opportunities for and/or prevent an attack on a network using a previously configured and designated routing indicator. Accordingly, the UE and the network, as described herein, may conserve resources consumed based on receiving malicious requests and/or resources consumed to thwart attacks using such malicious requests.

Figure 1B:
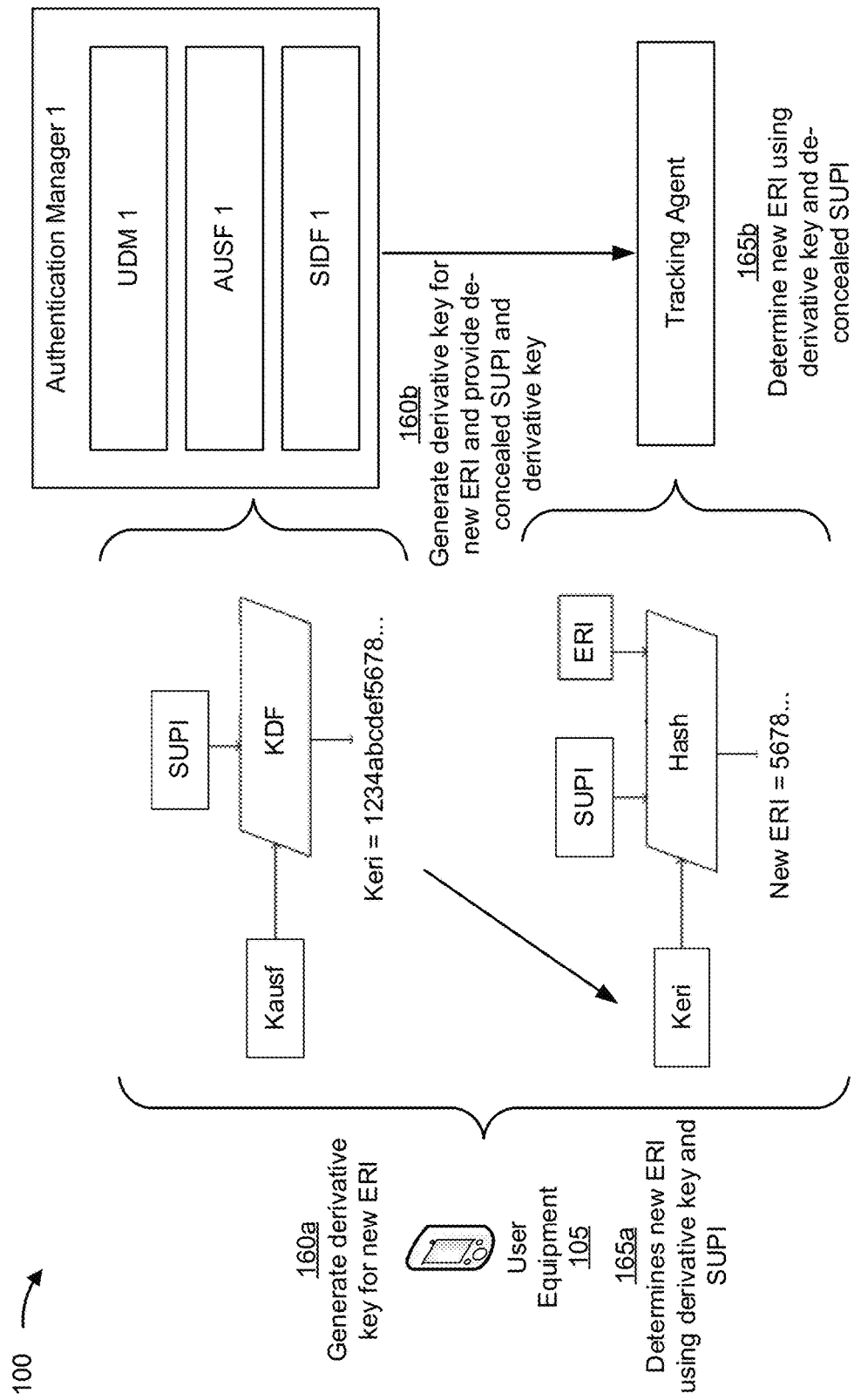
Figure 1C:
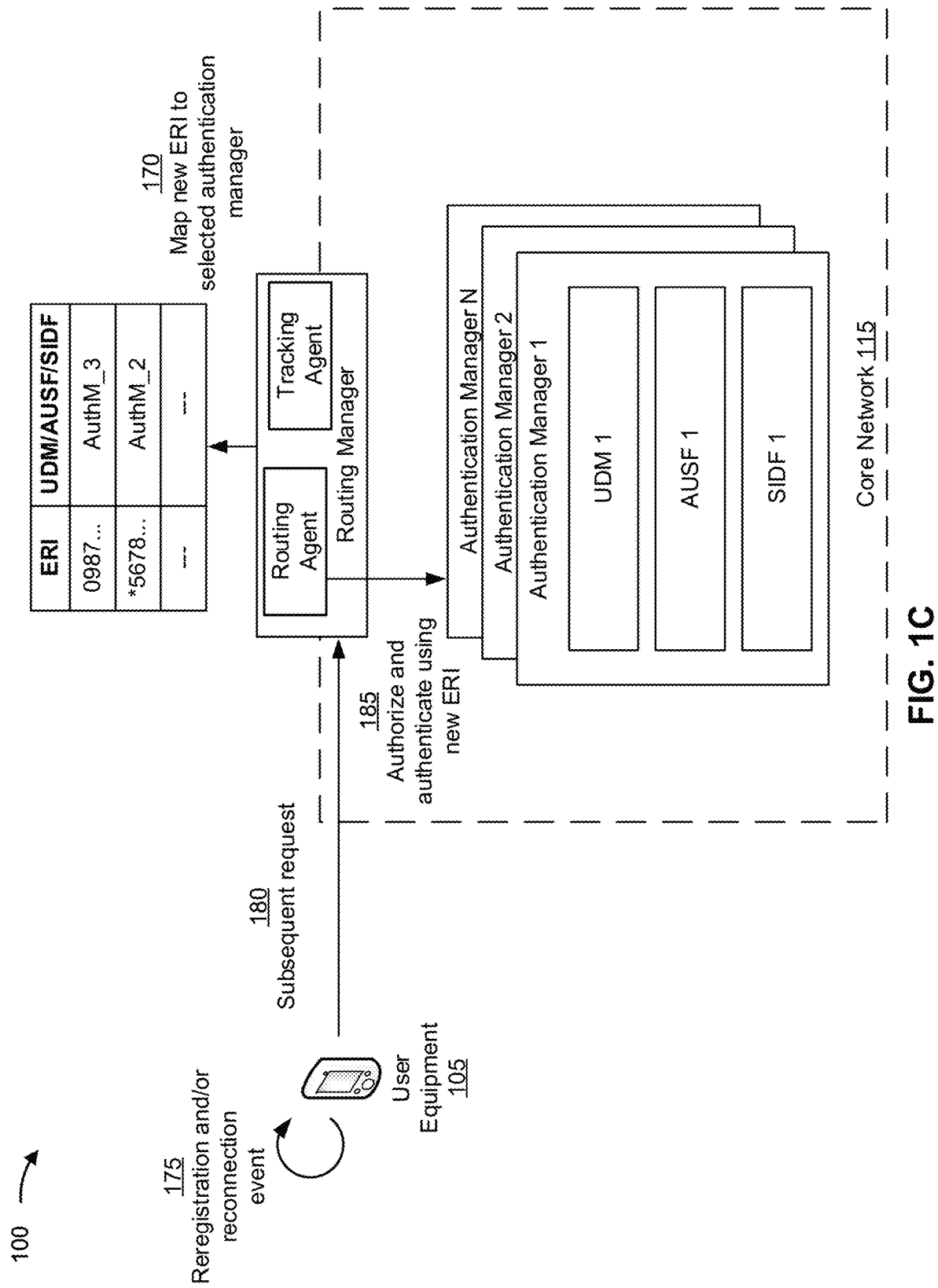

FIGS. 1A-1C are diagrams of an example 100 associated with using a unique routing indicator to connect to a network. As shown in FIGS. 1A-1C, example 100 includes a UE 105 and a core network 115. The core network 115 may be a core network of a wireless communication network (e.g., a 5G/NR network, a 4G/LTE network, and/or the like), as described herein.

The core network 115, in example 100, includes a routing manager and N authentication managers (referred to herein individually as an "authentication manager" and collective as "authentication managers"). The routing manager of example 100 includes a routing agent and a tracking agent. In some implementations, the routing manager may be associated with a radio access network (RAN) of the 5G/NR network. One or more of the authentication managers, as shown, includes an authentication server function (AUSF), a unified data management function (UDM), and a subscriber identity de-concealing function (SIDF) of the 5G/NR network.

As shown in FIG. 1A, and by reference number 130, the UE 105 may obtain a unique ERI (referred to herein as "the ERI"). For example, the UE 105 may be provisioned and/or preconfigured with the ERI during a manufacturing process to create the UE 105, and/or a subscription activation process associated with the UE 105. Additionally, or alternatively, the UE 105 may generate an ERI using a specific set of parameters. The parameters may, in some embodiments, be based on at least an event associated with the UE 105 connecting and/or reconnecting with the network. For example, the UE 105 may obtain the ERI based on the UE 105 being powered-on, based on a subscription of the UE 105 being activated, based on the UE 105 coming into a range of a base station of a radio access network (RAN) of the wireless communication network, based on a registration policy of the core network 115, and/or the like.

In this way, the UE 105 may receive and/or obtain the unique ERI to permit the UE 105 to send, to the core network 115, a configuration request that includes the ERI.

As further shown in FIG. 1A, and by reference number 135, the UE 105 sends a configuration request to the core network 115. For example, as shown, the UE 105 may transmit the configuration request to a routing manager of the core network 115. In some implementations, the routing manager is associated with the RAN of the wireless communication network (e.g., hosted by one or more components of one or more base stations of the RAN).

The configuration request may be transmitted to the routing manager in association with the UE 105 attempting to connect to the wireless communication network and/or communicate via the wireless communication network. For example, the configuration request may be associated with the UE 105 activating a subscription associated with the UE 105 and the wireless communication network (e.g., when the UE 105 (or a user of the UE 105) is subscribed to use a service of the wireless communication network), registering or reregistering the UE 105 with the core network 115 (e.g., according to a policy of the core network 115), reconnecting the UE 105 with the core network 115 (e.g., to establish a new communication link and/or communication session), and/or the like.

As described herein, the configuration request may be associated with and/or correspond to a SUCI that is generated or provided for authentication of the UE 105. Accordingly, the configuration request may include the routing indicator and a concealed SUPI that is to be de-concealed by one of the authentication managers that is mapped to the ERI, as described herein.

In this way, the UE 105 may send a configuration request to the core network 115 to connect to the wireless communication network and/or be able to establish a communication session via the wireless communication network.

As further shown in FIG. 1A, and by reference number 140, the routing manager performs a routing table lookup based on the ERI. For example, based on the configuration request including the ERI, the routing agent of the routing manager may perform the routing table lookup to identify an authentication manager that is processing the configuration request to authenticate the UE 105. The routing manager may perform the routing table lookup using any suitable technique (e.g., scanning, indexing, and/or the like).

In example 100, the routing manager maintains a routing table that maps ERIs to corresponding authentication managers (e.g., via addresses or identifiers of corresponding UDMs, AUSFs, and SIDFs) that are to authenticate UEs associated with the ERIs. For example, as UEs are manufactured and/or configured to be able to communicate via the wireless communication network, the routing table may be updated with the ERIs to permit the new UEs to be authenticated by the authentication managers. The ERIs may be mapped to the authentication managers in entries of the routing table via any suitable technique. As described herein, each ERI in the routing table is unique in that the ERI does not match any other ERI in the routing table.

As shown in example 100, an entry of the routing table includes an ERI [1234 . . . ] that is mapped to Authentication Manager 1 (shown as "AuthM 1" in the routing table). Accordingly, based on the configuration request including [1234 . . . ] in an ERI field, the routing manager may determine, from the entry in the routing table, that Authentication Manager 1 is to identify and/or authenticate the UE 105 to permit the UE 105 to access the wireless communication network.

In this way, the routing manager, via the routing agent, may look up the ERI in the configuration request to identify which of the authentication managers is to perform an identification and/or authentication process in-order to identify and then to authenticate the UE 105.

As further shown in FIG. 1A, and by reference number 145, the routing manager purges the entry of the routing table that includes the ERI. The routing manager may be configured to purge the routing entry based on receiving and/or identifying the ERI in the configuration request and the routing entry. For example, based on receiving the configuration request from the UE 105, the routing manager, via the routing agent, may purge the entry because the ERI has been used in connection with a configuration request. Additionally, or alternatively, the routing manager may purge the entry based on the configuration request being successfully routed and/or forwarded to an authentication manager identified in the entry. In some implementations, the routing manager may purge the entry based on the authentication manager indicating and/or confirming that the UE 105 was identified and/or authenticated (e.g., following an identification and/or authentication process described below).

In example 100, as shown, the entry may be purged by deleting, removing, and/or clearing (represented by the strike-through text) the ERI field and the assigned authentication manager field. In this way, the routing table can be used to receive an additional entry associated with another ERI (e.g., associated with the UE 105 or any other UE) and corresponding authentication manager identifier that is to authenticate a UE associated with the other ERI.

In some implementations, when purging the entry, the routing agent of the routing manager may clear the ERI from the entry. For example, the entry may be associated with Authentication Manager 1. Accordingly, the ERI, when purged, may be removed from the entry to permit the entry to be re-used with a different ERI that can be mapped to Authentication Manager 1. Additionally, or alternatively, the routing manager may remove allocated memory associated with the entry from a data structure that stores the routing table (e.g., by de-allocating the memory for use with the routing table and/or reallocating the memory used for the routing table for another use or storage of other data). In this way, the routing table may be used to load balance configuration requests that are to be provided to the authentication managers. More specifically, the routing table can be used by the tracking agent to track an availability of the authentication managers via open ERI fields of the entries and/or track a quantity of ERIs that are associated with a same authentication manager.

As described herein, a new ERI is to be generated for the UE 105 after the ERI is used to authenticate the UE 105. In other words, the ERI may be used once before the ERI is discarded and/or removed from the routing table. Accordingly, the routing manager may purge the entry to prevent the routing table from storing multiple ERIs associated with a same UE prevent the ERIs from being fixed in the routing table, thereby preventing or reducing a malicious actor's ability to obtain or use previously used ERIs to overload the wireless communication network. Furthermore, the routing manager may purge the entry to conserve storage resources of a data structure associated with the routing table because new ERIs associated with the UE 105 (and/or other UEs) are going to be continuously added to the routing table after previous ERIs are used.

In this way, the ERI is removed from the routing table because the ERI is configured for a single use with respect to authenticating the UE 105. Furthermore, the ERI may be removed to permit a different ERI (associated with the UE 105 or any other UE) to be mapped to the authentication manager of the entry (Authentication Manager 1) or any other one of the authentication managers.

As further shown in FIG. 1A, and by reference number 150, the routing manager routes the configuration request to the authentication manager. For example, the routing agent, based on the routing table lookup, may forward the configuration to the authentication manager that is mapped to the ERI in the configuration request. In example 100, based on identifying that the ERI is being mapped to Authentication Manager 1 in an entry of the routing table, the routing agent may forward the configuration request to the Authentication Manager 1 to permit the Authentication Manager 1 to identify (e.g., de-conceal) and/or authenticate the UE 105.

In this way, the routing manager may forward the configuration request to the assigned authentication manager to permit the authentication manager to perform an identification and/or authentication process associated with the UE 105.

As further shown in FIG. 1A, and by reference number 155, the authentication manager de-conceals and authenticates the UE 105. For example, the authentication manager may de-conceal, using the concealment key, the SUCI to obtain and/or identify the SUPI of the UE 105. Based on the SUPI, the authentication manager may authenticate the UE 105 using any suitable technique that verifies/validates that the SUPI is associated with a valid subscription to the wireless communication network).

According to some implementations, the authentication manager may identify the UE 105 using the unique ERI and therefore further de-concealment process may be avoided. For example, because the ERI is configured to be unique and/or be a longer length (relative to previous routing indicators), the ERI adds a layer of security that permits the authentication manager to forgo decryption of the SUCI. More specifically, the authentication manager may be configured to authenticate the UE 105 based on receiving and/or determining an expected SUPI (E-SUPI) that corresponds to a decryption of a concealed SUPI (C-SUPI) in the SUCI. The E-SUPI may be maintained in a de-concealing table that is mapped to a key that was used to determine the E-SUPI and/or decrypt the C-SUPI. Because the C-SUPI is generated using a same encryption key as the E-SUPI, the authentication manager may validate the UE 105 based on looking up the E-SUPI in a de-concealing table. Based on the presence of the E-SUPI being in the de-concealing table (indicating that the E-SUPI is associated with an active/pending UE) and/or based on the E-SUPI being mapped to the ERI, the authentication manager may forgo decrypting the C-SUPI (to identify the SUPI) and/or authenticating the UE 105 based on the SUPI of the UE 105.

In some implementations, based on an authentication of the UE 105, the authentication manager, for added security, may generate a new concealment key for subsequent requests associated with the UE 105. For example, the new concealment key may be generated based on the ERI and the SUPI. The new concealment key can be stored in the de-concealing table to permit the authentication manager to de-conceal a newly received C-SUPI that is associated with a new ERI used by the UE 105 in a subsequent request, as described herein.

In this way, the authentication manager may identify and authenticate the UE 105 based on the unique ERI, as described herein.

As shown in FIG. 1B, and by reference number 160a, the UE 105 generates a derivative key (shown as "Keri") for a new ERI. The UE 105 may generate and/or determine the derivative key using any suitable technique. For example, as shown, the UE 105 may use a key derivation function (KDF) that generates the derivative key based on the SUPI and a key (Kausf) associated with the core network 115 (and/or the authentication managers). The key (Kausf) is generated based on successful authentication of the UE 105 with the core network 115. In some implementations, the UE 105 may use a unique string or other variable as an input to the KDF to generate the derivative key.

In this way, the UE 105 may generate a derivative key from the SUPI that can be used to generate a new ERI for a subsequent request that is to be sent to the core network 115. For example, as described herein, the UE 105 may generate the new ERI to update or override a previously used ERI (or default ERI) so that the UE 105 can use different ERIs for subsequent requests, thereby preventing (or reducing an ability of) a malicious actor from identifying and/or using an active ERI of the UE 105 to send a malicious request (and/or correspondingly overload the routing manager and/or authentication manager with multiple corresponding malicious requests).

As further shown in FIG. 1B, and by reference number 160b, the authentication manager generates the derivative key for the new ERI and provides the de-concealed SUPI and the derivative key to the tracking agent of the routing manager. For example, the authentication manager and the UE 105 may be configured to use the same KDF and the same inputs (e.g., the SUPI that was de-concealed during the authentication process and/or the same unique string) to generate the derivative key. The authentication manager may generate the derivative key based on de-concealing the SUPI (e.g., because the SUPI is used to generate the derivative key). After generating the derivative key, the authentication manager, in example 100, provides the SUPI and the derivative key to the tracking agent.

In this way, the authentication manager may provide the derivative key and the SUPI to the tracking agent to permit the tracking agent to determine a new ERI that is to be used to route a subsequent request from the UE 105.

As further shown in FIG. 1B, and by reference number 165a, the UE 105 determines a new ERI for the UE 105 using the derivative key (e.g. Kausf), that it had generated from a previous successful authentication with the core network 11 and the SUPI of the UE 105. The UE 105 may generate and/or determine the new ERI using any suitable technique. For example, as shown, the UE 105 may use a hash function (e.g., a keyed-hash message authentication code (HMAC)) that generates the new ERI based on the SUPI and the most recent ERI. Similarly to determining the derivative key, the UE 105 may use a unique string (a same or different string used to determine the derivative key) as an input to the hash function to generate/determine the new ERI. In some implementations, the UE 105 may generate and/or the determine the new ERI based on detecting an event that requires transmission of a configuration request, as described herein, to connect to the network (e.g., based on becoming disconnected with the wireless communication network, based on coming within communication range of a base station of the RAN, based on a requirement to reregister with the core network 115 according to a policy of the core network 115, and/or the like).

As described herein, after each use of an ERI within a configuration request of the UE 105, a new ERI is generated for any subsequently transmitted configuration requests. Accordingly, the new ERI has a different value than the ERI that was provided in connection with the configuration request described above in connection with example 100 and is described in the following as "the previous ERI."

In this way, the UE 105 may generate and/or determine a new ERI for transmitting a subsequent request.

As further shown in FIG. 1B, and by reference number 165b, the tracking agent, of the routing manager, determines the new ERI using the derivative key and the de-concealed SUPI. For example, based on receiving the derivative key and the SUPI from the authentication manager, the tracking agent may be configured to use the same hash function and the same inputs (e.g., the derivative key, the SUPI, and the previous ERI) to generate the new ERI.

In this way, the routing manager may determine the new ERI (e.g., separately from the UE 105) to permit the routing manager to receive and/or process a subsequent request from the UE 105, as described herein.

As shown in FIG. 1C, and by reference number 170, the routing manager maps the new ERI to a selected authentication manager. For example, as shown, the tracking agent, of the routing manager, may store the new ERI [5678 . . . ] in an entry of the routing table to permit the UE 105 to connect to the network via a subsequent configuration message. The entry may map the new ERI to an authentication manager that is to identify and/or authenticate the UE 105 via the subsequent configuration message. The entry may be a same entry that included the previous ERI and/or any other entry of the routing table (e.g., an entry of an authentication manager that has an empty ERI field, indicating that the corresponding authentication manager is available to authenticate the UE 105 via a subsequent authentication).

The tracking agent may select an authentication manager for any subsequent request from the UE 105. For example, as shown in example 100, the tracking agent may select Authentication Manager 2 (shown as "AuthM 2" in the routing table) based on one or more characteristics of the new ERI (e.g., a value, timing associated with the new ERI being generated or received, and/or the like), based on a location associated with the UE 105 (e.g., a location of the UE 105 during authentication, a home (or default) location associated with the UE 105, and/or the like), based on a location associated with the routing manager (e.g., a location of one or base stations of the RAN), and/or the like. Accordingly, as shown, the new ERI is mapped to Authentication Manager 2 in the routing table.

In this way, the new ERI is mapped to an authentication manager to permit the UE 105 to be identified and/or re-authenticated when the UE 105 sends a subsequent configuration message with the new ERI, which was also generated by the UE 105.

As further shown in FIG. 1C, and by reference number 175, the UE 105 experiences a reregistration and/or reconnection event. For example, the UE 105, based on a policy of the wireless communication network, may be configured to reregister (e.g., via a configuration request) with the core network 115. Additionally, or alternatively, after being disconnected or losing a communication link with the RAN, the UE 105 may detect that the UE 105 is within range of a base station of the RAN and determine that the UE 105 may reconnect to the wireless communication network.

In this way, the UE 105 may detect a reregistration event and/or reconnection event that causes the UE 105 to generate and/or send a subsequent request to the core network 115.

As further shown in FIG. 1C, and by reference number 180, the UE 105 sends a subsequent request to the routing manager and/or intercepted by the routing manager. For example, similar to a configuration request to activate a subscription for the UE 105, the UE 105 may send another configuration request to reregister with the core network 115 and/or reconnect to the wireless communication network, as described herein. Furthermore, such a configuration request involves the core network 115 identifying and authenticating the UE 105 to permit the UE 105 to communicate via the wireless communication network.

The subsequent request, in example 100, includes the new ERI that was generated based on the derivative key (which was generated based on the previous ERI associated with the UE 105) and the SUPI of the UE 105. Accordingly, the subsequent request uses a different ERI than the previous configuration request described in connection with FIG. 1A.

In this way, the UE 105 may send a configuration request that uses a different ERI than an ERI that was previously used in a previous configuration request.

As further shown in FIG. 1C, and by reference number 185, the routing manager authorizes and requests the designated authentication manager to identify and authenticate the UE 105, as described herein, using the new ERI. Further, the UE 105 and the core network 115 may iteratively generate a new derivative key from the new ERI, and use the new derivative key and the SUFI of the UE 105 to determine another new ERI for any further configuration requests from the UE 105.

In this way, the UE 105 and the core network 115 may iteratively receive, generate, and/or determine new and unique ERIs for each configuration request associated with the UE 105. Because the ERI for a configuration request of the UE 105 (and/or any or all UEs that are to communicate via the network), the ability of malicious actors to submit a malicious configuration request and/or overload a network with malicious configuration requests is reduced, thereby improving the performance and service of the network, conserving computing resources of network devices of the network, and conserving communication resources of the network.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
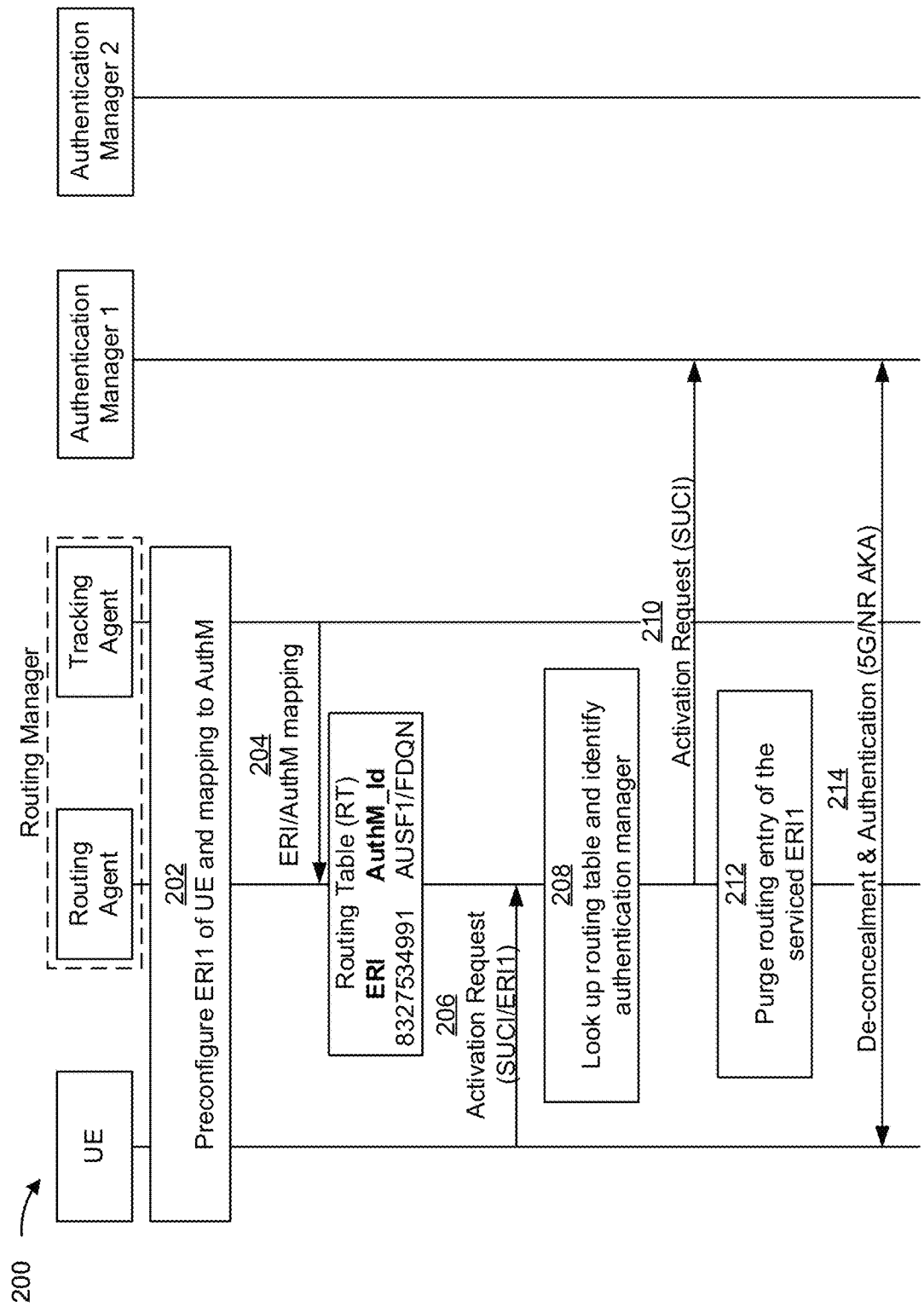
FIGS. 2A and 2B illustrate a call flow diagram associated with an example implementation described herein.
Figure 2B:
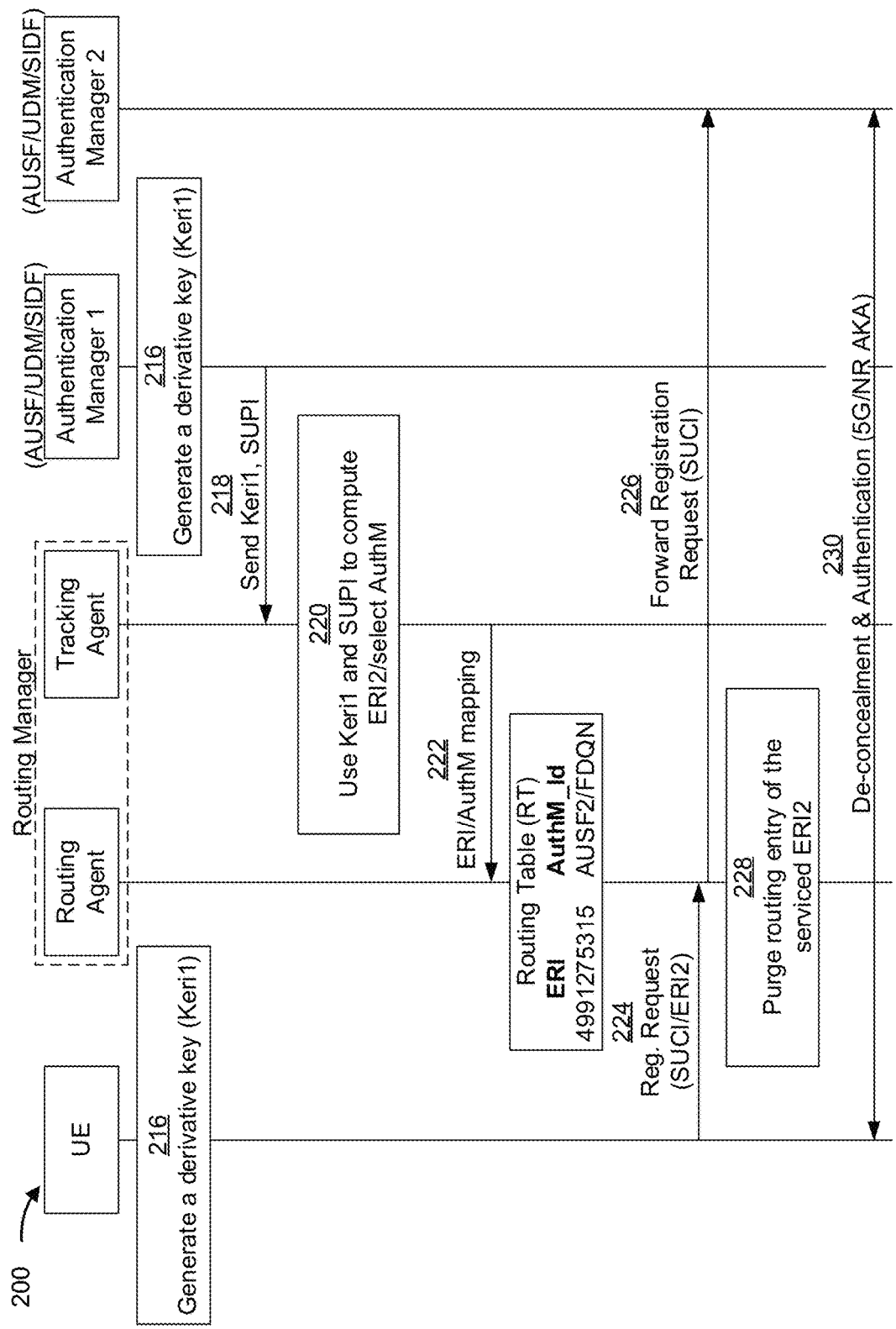

FIGS. 2A and 2B illustrate a call flow diagram associated with an example 200 associated with using a unique routing indicator to connect to a network. As shown in FIGS. 2A and 2B, a UE (e.g., the UE 105 of example 100), a routing manager (e.g., the routing manager of example 100), and authentication managers (e.g., a first authentication manager (shown as "Authentication Manager 1") and a second authentication manager (shown as "Authentication Manager 2"), which may correspond to two of the authentication managers of example 100) may communicate with one another. The routing manager and the authentication managers may be associated with a wireless communication network.

As show in FIG. 2A, and by reference number 202, a first routing indicator (ERI1) and a mapping of the first routing indicator is preconfigured for the UE (and/or, for example, stored in a data structure of the UE) and the first authentication manager. The first routing indicator may be randomly generated by a service provider and/or manufacturer associated with the UE and provisioned via a provisioning process associated with the UE and/or the wireless communication network. The tracking agent, as shown by reference number 204, provides, to the routing agent, the mapping of the first routing indicator to the first authentication manager. As shown, the routing agent stores the first routing indicator in an entry of a routing table that includes a fully qualified domain name (FQDN) of an UDM/SIDF of AUSF (AUSF1) of the first authentication manager.

As further shown in FIG. 2A, and by reference number 206, the UE sends an activation request (including a SUCI and the first routing indicator) to the routing agent. The routing agent, as shown by reference number 208, looks up the routing table and identifies the first authentication manager (e.g., as a destination of the configuration request). As shown by reference number 210, the routing agent forwards the activation request (including the SUCI) to the first authentication manager. As shown by reference number 212, the routing agent purges the routing entry of the serviced first routing indicator. As shown by reference number 214, the first authentication manager performs a de-concealment of a SUPI of the UE and an authentication process (e.g., a 5G/NR authentication and key agreement (AKA)) to authenticate the UE using the SUPI.

As shown in FIG. 2B, and by reference number 216, the UE and the first authentication manager generate a derivative key (Keri1). For example, as described herein, the derivative key may be generated using a function and the SUPI of the UE. As shown by reference number 218, the first authentication manager provides the derivative key and the SUPI to the tracking agent. As shown by reference number 220, the tracking agent uses the derivative key and the SUPI to compute a second routing indicator (ERI2) and selects the second authentication manager for authentication of the UE based on receiving a configuration request with the second routing indicator. As shown by reference number 222, the tracking agent provides the new mapping for the second routing indicator to the routing agent, which includes the second routing indicator in an entry with an FQDN of an UDM/SIDF/AUSF (AUSF2) of the second authentication manager.

As further shown in FIG. 2B, and by reference number 224, the UE sends a registration request to the routing agent that includes the second routing indicator and the SUCI. As described herein, the UE may compute the second routing indicator using the derivative key and the SUPI (similar to the tracking agent). As shown by reference number 226, the routing agent forwards the registration request with the SUCI to the second authentication manager. The routing manager, as shown by reference number 228, purges the routing entry of the serviced second routing indicator. As shown by reference number 230, the second authentication manager performs the de-concealment of the SUPI of the UE and the authentication process.

As indicated above, FIGS. 2A and 2B are provided as an example. Other examples may differ from what is described with respect to FIGS. 2A and 2B.

Figure 3A:
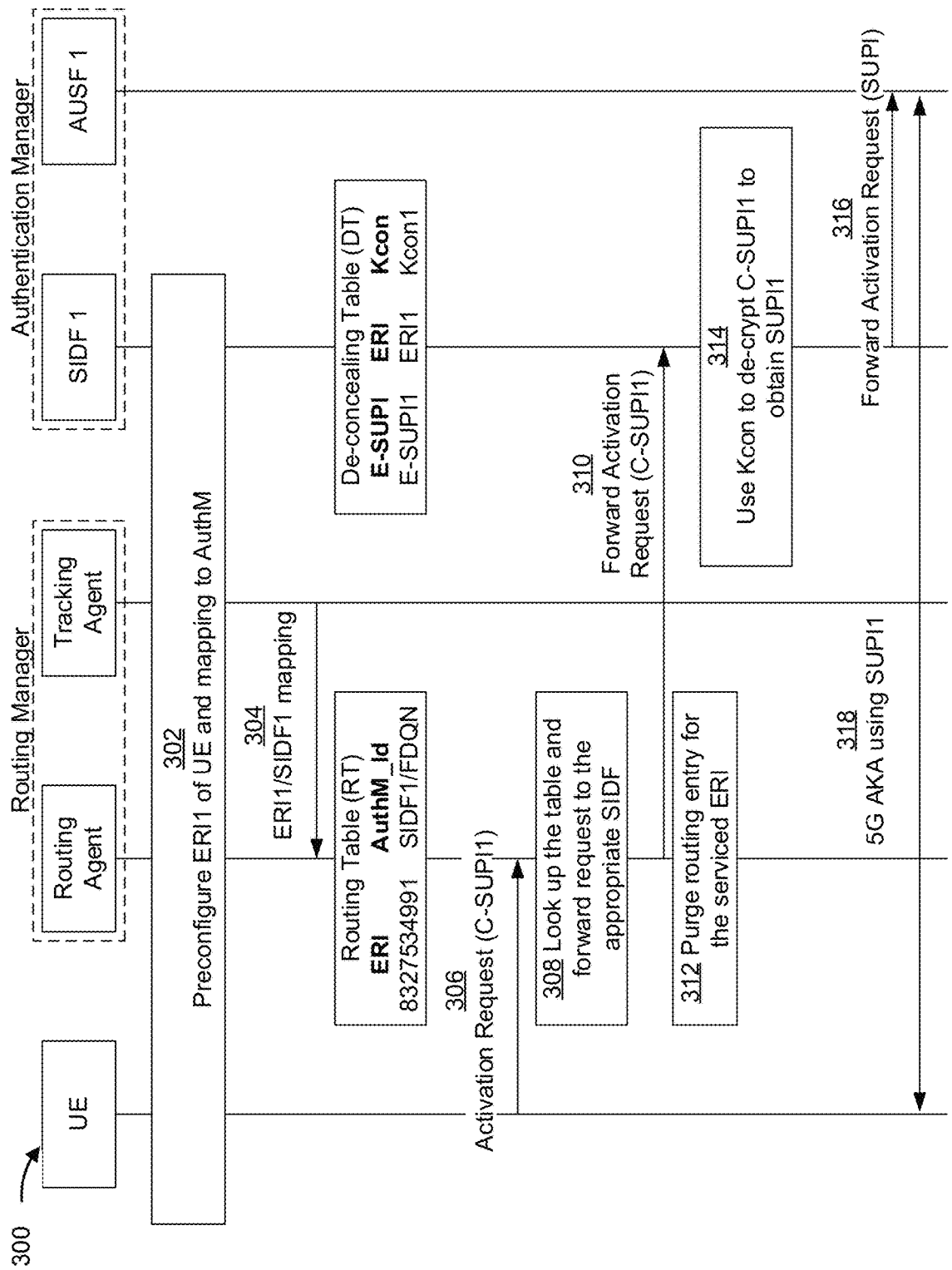
FIGS. 3A and 3B illustrate a call flow diagram associated with an example implementation described herein.
Figure 3B:
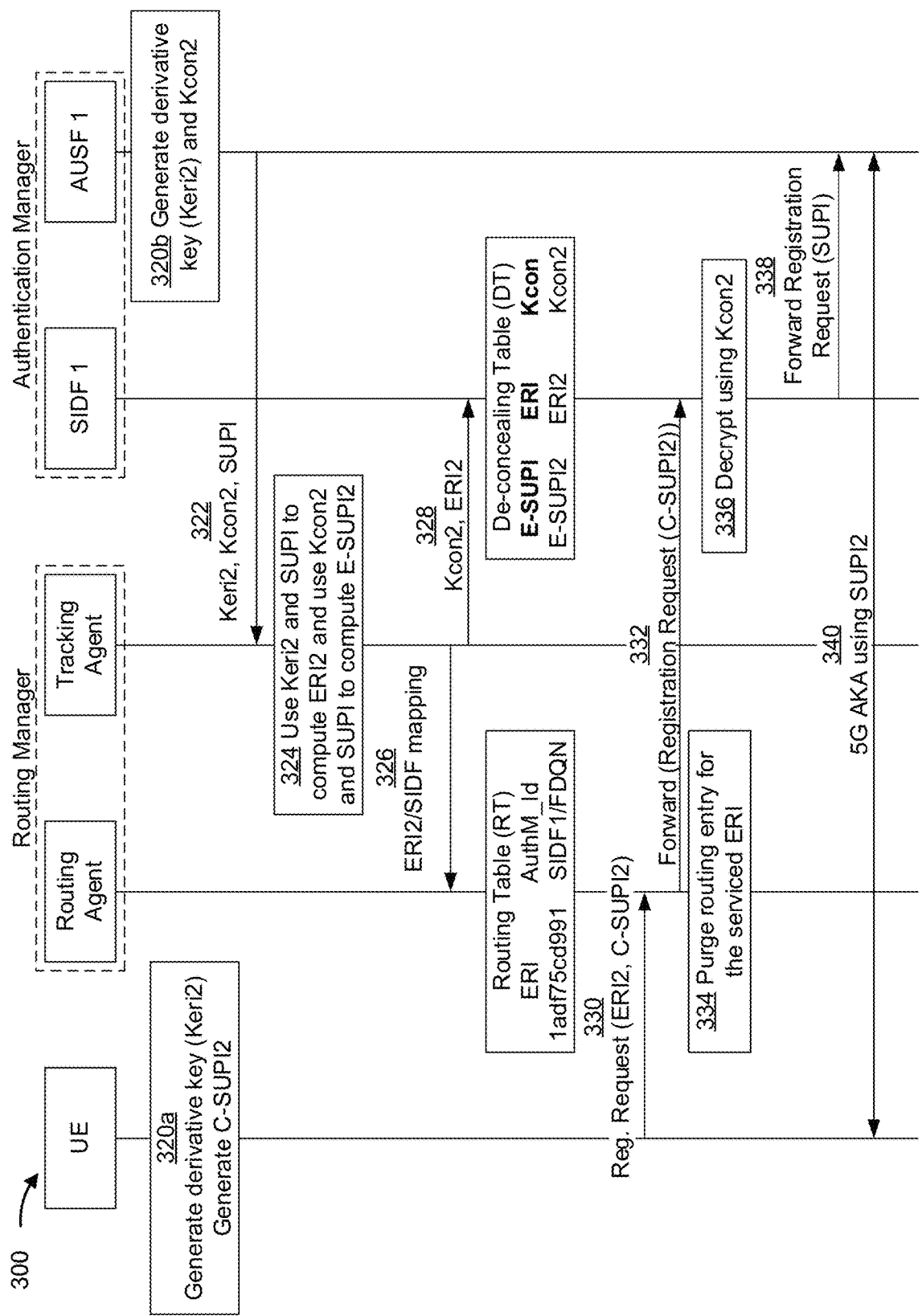

FIGS. 3A and 3B illustrate a call flow diagram associated with an example 300 associated with using a unique routing indicator to connect to a network. As shown in FIGS. 3A and 3B, a UE (e.g., the UE 105 of example 100), a routing manager (e.g., the routing manager of example 100), and an authentication manager (e.g., the authentication manager of example 100) may communicate with one another. In example 300, the routing manager includes a routing agent (e.g., the routing agent of example 100) and a tracking agent (e.g., the routing agent of example 100), and the authentication manager includes an SIDF (e.g., SIDF 1 of example 100) and an AUSF (e.g., AUSF 1 of example 100). The routing manager and the authentication manager may be associated with a wireless communication network.

As show by reference number 302, a first routing indicator (ERI1) and a mapping of the first routing indicator is preconfigured for the UE (for example, and stored in a data structure of the UE) and the authentication manager. The tracking agent, as shown by reference number 304, provides, to the routing agent, the mapping of the first routing indicator to an SIDF (SIDF 1) of the authentication manager. As shown, the routing agent stores the first routing indicator in an entry of a routing table that includes an FQDN of the SIDF of the authentication manager. Furthermore, the SIDF is configured to store a mapping of a first E-SUPI (E-SUPI1) with a first concealment key (Kcon1) in an entry (e.g., a de-conceal entry) of the de-concealing table. The first E-SUPI may be associated with the SUPI based on the first concealment key. The first concealment key may be a key that is provisioned for the UE to generate a C-SUPI associated with the UE.

As further shown in FIG. 3A, and by reference number 306, the UE sends an activation request, including a first C-SUPI (C-SUPI1) and the first routing indicator, to the routing agent. The routing agent, as shown by reference number 308, looks up an entry in the routing table and identifies the SIDF of the authentication manager (e.g., as a destination of the configuration request). As shown by reference number 310, the routing agent forwards the activation request (including the C-SUPI) to the SIDF. As shown by reference number 312, the routing agent purges the routing entry of the serviced first routing indicator. As shown by reference number 314, the SIDF uses the ERI and the first concealment key to decrypt the first C-SUPI to de-conceal a SUPI (SUPI1) of the UE. The SIDF, as shown by reference number 316, forwards the SUPI to the AUSF of the authentication manager. As shown by reference number 318, the AUSF performs an authentication process (e.g., a 5G/NR AKA) to authenticate the UE using the SUPI.

As shown in FIG. 3B, and by reference number 320a, the UE generates a derivative key (Keri2) and a second concealment key, (Kcon2), as described herein. Generation of the second concealment key provides and/or enables data confidentiality. In some implementations, the second concealment key may be a derivative key that is generated based on the first concealment key and/or in a similar manner as the derivative key (Keri2). As shown by reference number 320b, the AUSF generates the derivative key and the second concealment key (Kcon2). As shown by reference number 322, the AUSF provides the derivative key, the second concealment key, and the SUPI to the tracking agent. The tracking agent, as shown by reference number 324, uses the second concealment key and the SUPI to compute a second routing indicator (ERI2) and uses the second concealment key and the SUPI to compute a second E-SUPI (E-SUPI2). As shown by reference number 326, the tracking agent provides the new mapping for the second routing indicator to the routing agent, which includes the second routing indicator in an entry with an FQDN of the SIDF. Further, as shown by reference number 328, the tracking agent provides a mapping of the second routing indicator, ERI2, second concealment key and the second E-SUPI to the SIDF, which stores the second routing indicator, ERI2, second concealment key and the second E-SUPI in an entry of the de-concealing table.

As further shown in FIG. 3B, and by reference number 330, the UE sends a registration request to the routing agent that includes the second routing indicator and a second C-SUPI (C-SUPI2) (generated using the second concealment key). As shown by reference number 332, the routing agent forwards the registration request with the second routing indicator, ERI2 and the second C-SUPI to the SIDF. The routing manager, as shown by reference number 334, purges the routing entry of the serviced second routing indicator. As shown by reference number 336, the SIDF performs a look-up of the de-concealing table for the second routing indicator, ERI2 sent by the routing agent at 332 and obtains the associated entry for second concealment key, Kcon2 and the E-SUPI. The SIDF decrypts the C-SUPI received from the routing agent at 332 using the second concealment key (Kcon2) to obtain the SUPI. The SIDF may verify that SUPI that has been decrypted matches the E-SUPI entry. If the SUPI matches the E-SUPI values then as shown by reference number 338, the SIDF forwards the SUPI to the AUSF for authentication of the UE, and the AUSF performs the de-authentication process, as shown by reference number 340.

As indicated above, FIGS. 3A and 3B are provided as an example. Other examples may differ from what is described with respect to FIGS. 3A and 3B.

Figure 4:
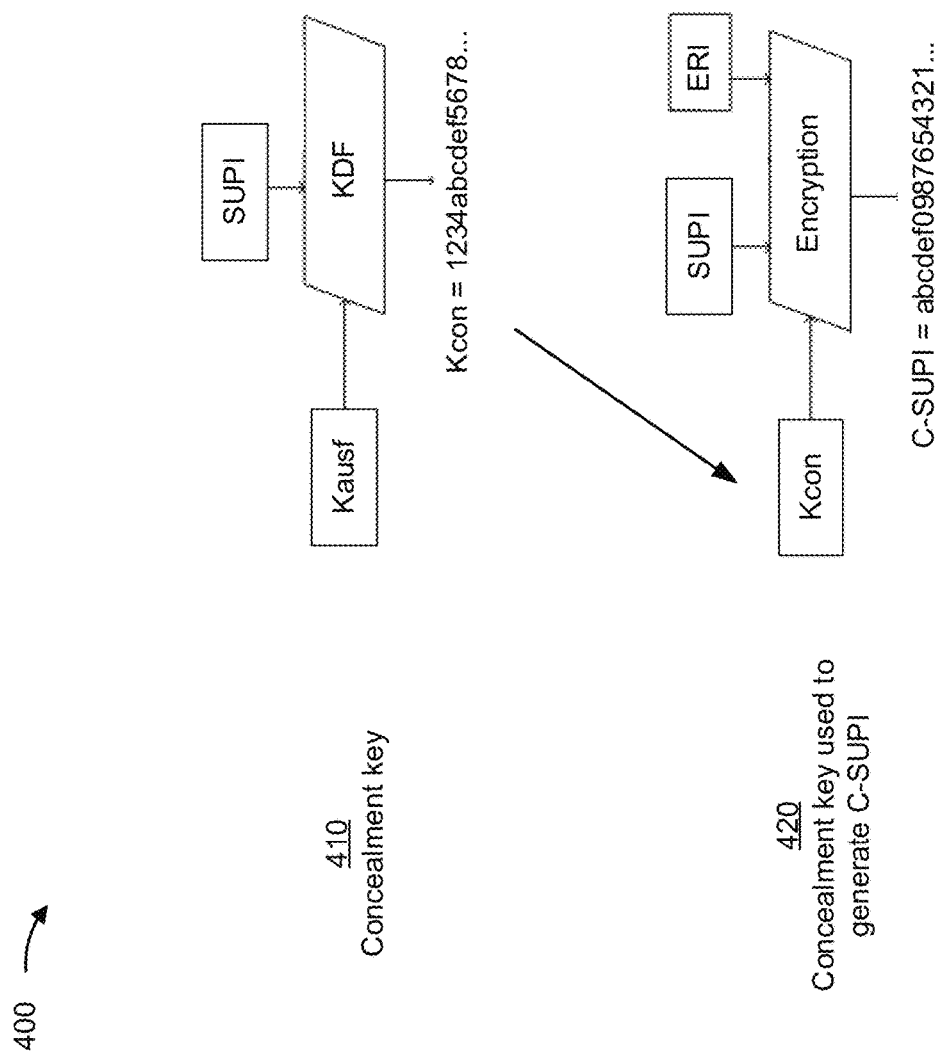
FIG. 4 is a diagram associated with an example implementation described herein.

FIG. 4 is a diagram of an example 400 associated with using a unique routing indicator to connect to a network. Example 400 illustrates an example of generating and/or using a concealment key for use in connection with an ERI, as described herein.

As shown in FIG. 4, and by reference number 410, a UE and/or an authentication manager may generate a concealment key (shown as "Kcon") for a UE. The UE and/or the authentication manager generate and/or determine the concealment key using any suitable technique. For example, as shown, UE and/or the authentication manager may use a key derivation function (KDF) that generates the concealment key based on the SUPI (known to the UE and de-concealed by the authentication manager) and a key (Kausf) associated with the core network 115 (and/or the authentication managers). The key (Kausf) may be generated based on successful authentication of the UE by the authentication manager. In some implementations, the UE and/or the authentication manager may use a unique string or other variable as an input to the KDF to generate the concealment key.

As further shown in FIG. 4, and by reference number 420, the UE and/or the authentication manager may generate a concealment key from the SUPI and an ERI generate a C-SUPI. For example, as described herein, the UE may provide the C-SUPI in a request and/or the authentication manager may authenticate the UE based on the C-SUPI and an E-SUPI that is mapped to the ERI. In this way, the UE and/or the authentication manager may use a concealment key that is generated based on the SUPI and used to encrypt the SUPI and an ERI to form a C-SUPI.

As indicated above, FIG. 4 is provided as an example. Other examples may differ from what is described with regard to FIG. 4.

Figure 5:
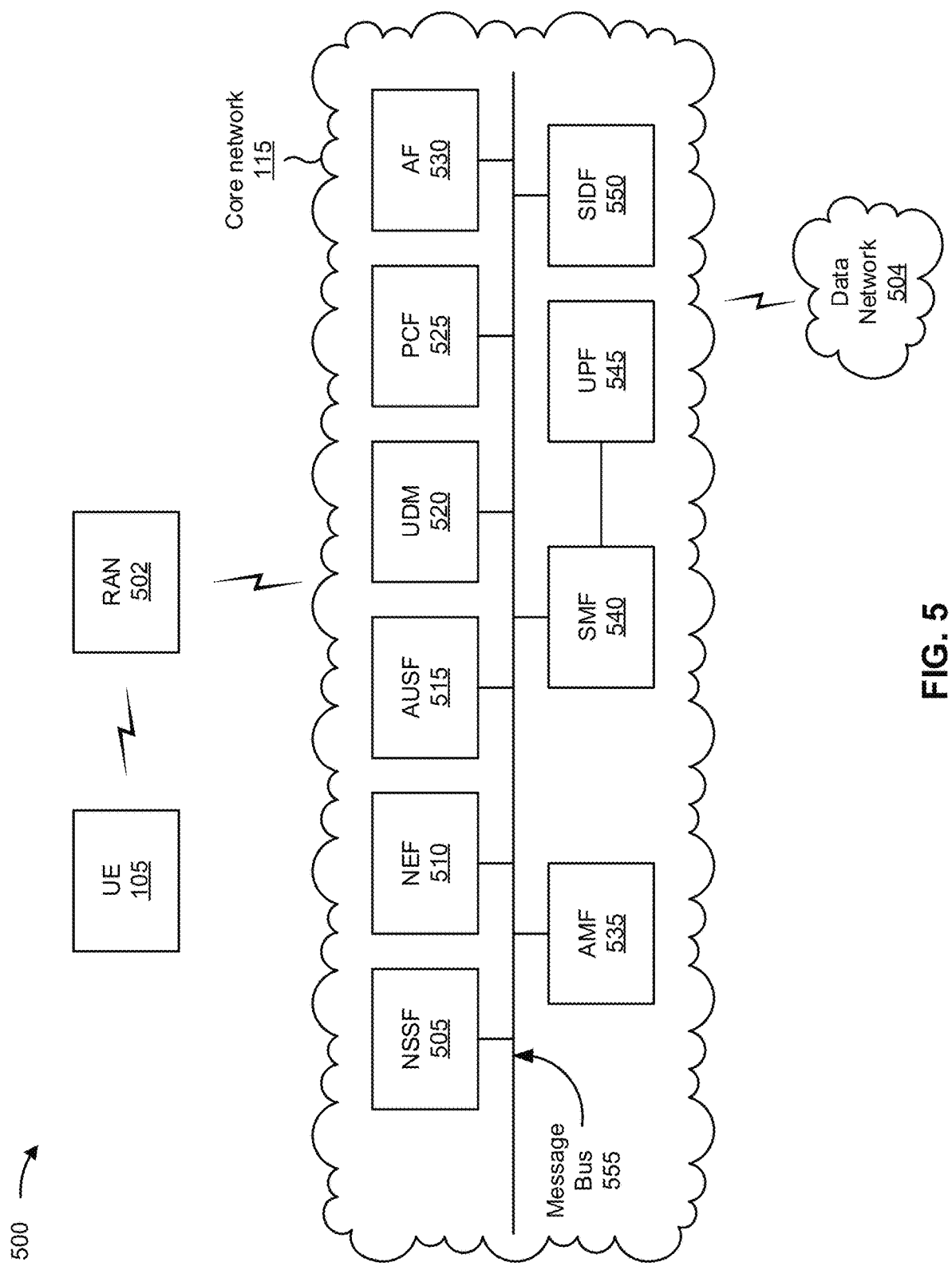
FIG. 5 is a diagram of an example environment in which systems and/or methods described herein may be implemented.

FIG. 5 is a diagram of an example environment 500 in which systems and/or methods described herein may be implemented. As shown in FIG. 5, example environment 500 may include a UE 105, a core network 115, a RAN 502 and a data network 504. Devices and/or networks of example environment 500 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 502 may support, for example, a cellular radio access technology (RAT). RAN 502 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 502 may transfer traffic (e.g., using a routing agent, such as the routing agent of example 100) between UE 105 (e.g., using a cellular RAT), one or more base stations (e.g., using a wireless interface or a backhaul interface, such as a wired backhaul interface), and/or core network 115. RAN 502 may provide one or more cells that cover geographic areas.

In some implementations, RAN 502 may perform scheduling and/or resource management for UE 105 covered by RAN 502 (e.g., UE 105 covered by a cell provided by RAN 502). In some implementations, RAN 502 may be controlled or coordinated by a network controller (e.g., associated with a tracking agent, such as the tracking agent of example 100), which may perform load balancing, network-level configuration, and/or the like. The network controller may communicate with RAN 502 via a wireless or wireline backhaul. In some implementations, RAN 502 may include a network controller, a self-organizing network (SON) module or component, or a similar module or component. In other words, RAN 502 may perform network control, scheduling, and/or network management functions (e.g., for uplink, downlink, and/or sidelink communications of UE 105 covered by RAN 502).

Data network 504 includes one or more wired and/or wireless data networks. For example, data network 504 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture, a 5G core network, and/or the like.

As shown in FIG. 5, core network 115 may include a number of functional elements. The functional elements may include, for example, a network slice selection function (NSSF) 505, a network exposure function (NEF) 510, an AUSF 515, a UDM component 520, a policy control function (PCF) 525, an application function (AF) 530, an access and mobility management function (AMF) 535, a session management function (SMF) 540, a user plane function (UPF) 545, and/or the like. These functional elements may be communicatively connected via a message bus 555. Each of the functional elements shown in FIG. 5 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 505 includes one or more devices that select network slice instances for UE 105. By providing network slicing, NSSF 505 allows an operator to deploy multiple substantially independent end-to-end networks potentially with the same infrastructure. In some implementations, each slice may be customized for different services.

NEF 510 includes one or more devices that support exposure of capabilities and/or events in the wireless telecommunications system to help other entities in the wireless telecommunications system discover network services.

AUSF 515 includes one or more devices that act as an authentication server and support the process of authenticating UE 105 in the wireless telecommunications system (e.g., using a SUPI).

UDM 520 includes one or more devices that store user data and profiles in the wireless telecommunications system. UDM 520 may be used for fixed access, mobile access, and/or the like, in core network 115.

PCF 525 includes one or more devices that provide a policy framework that incorporates network slicing, roaming, packet processing, mobility management, and/or the like.

AF 530 includes one or more devices that support application influence on traffic routing, access to NEF 510, policy control, and/or the like.

AMF 535 includes one or more devices that act as a termination point for non-access stratum (NAS) signaling, mobility management, and/or the like.

SMF 540 includes one or more devices that support the establishment, modification, and release of communication sessions in the wireless telecommunications system. For example, SMF 540 may configure traffic steering policies at UPF 545, enforce user equipment IP address allocation and policies, and/or the like.

UPF 545 includes one or more devices that serve as an anchor point for intraRAT and/or interRAT mobility. UPF 545 may apply rules to packets, such as rules pertaining to packet routing, traffic reporting, handling user plane QoS, and/or the like.

SIDF 550 includes one or more devices that are configured to de-conceal (e.g., using a decryption process) a SUPI of the UE to permit AUSF 515 to authenticate the UE via the SUPI.

Message bus 555 represents a communication structure for communication among the functional elements. In other words, message bus 555 may permit communication between two or more functional elements.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example environment 500 may perform one or more functions described as being performed by another set of devices of example environment 500.

Figure 6:
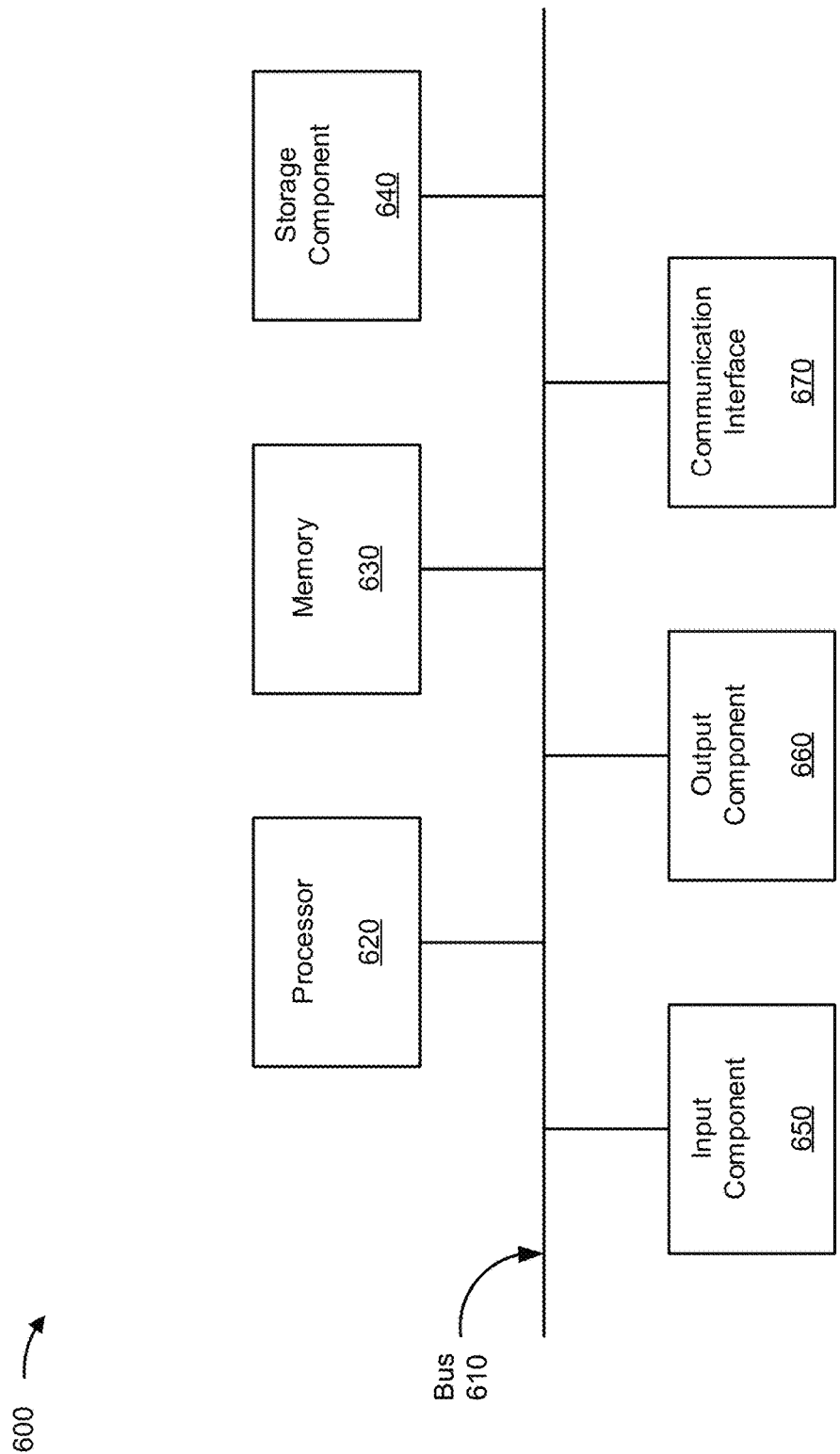
FIG. 6 is a diagram of example components of one or more devices of FIG. 5.

FIG. 6 is a diagram of example components of a device 600, which may correspond to UE 105, a base station of RAN 502, and/or one or more of the components of core network 115. In some implementations, UE 105, a base station of RAN 502, and/or one or more of the components of core network 115 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, an actuator, and/or the like. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, an antenna, and/or the like.

Device 600 may perform one or more processes described herein. For example, a non-transitory computer-readable medium (e.g., memory 630 and/or storage component 640) may store a set of instructions (e.g., one or more instructions, code, software code, program code, and/or the like) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
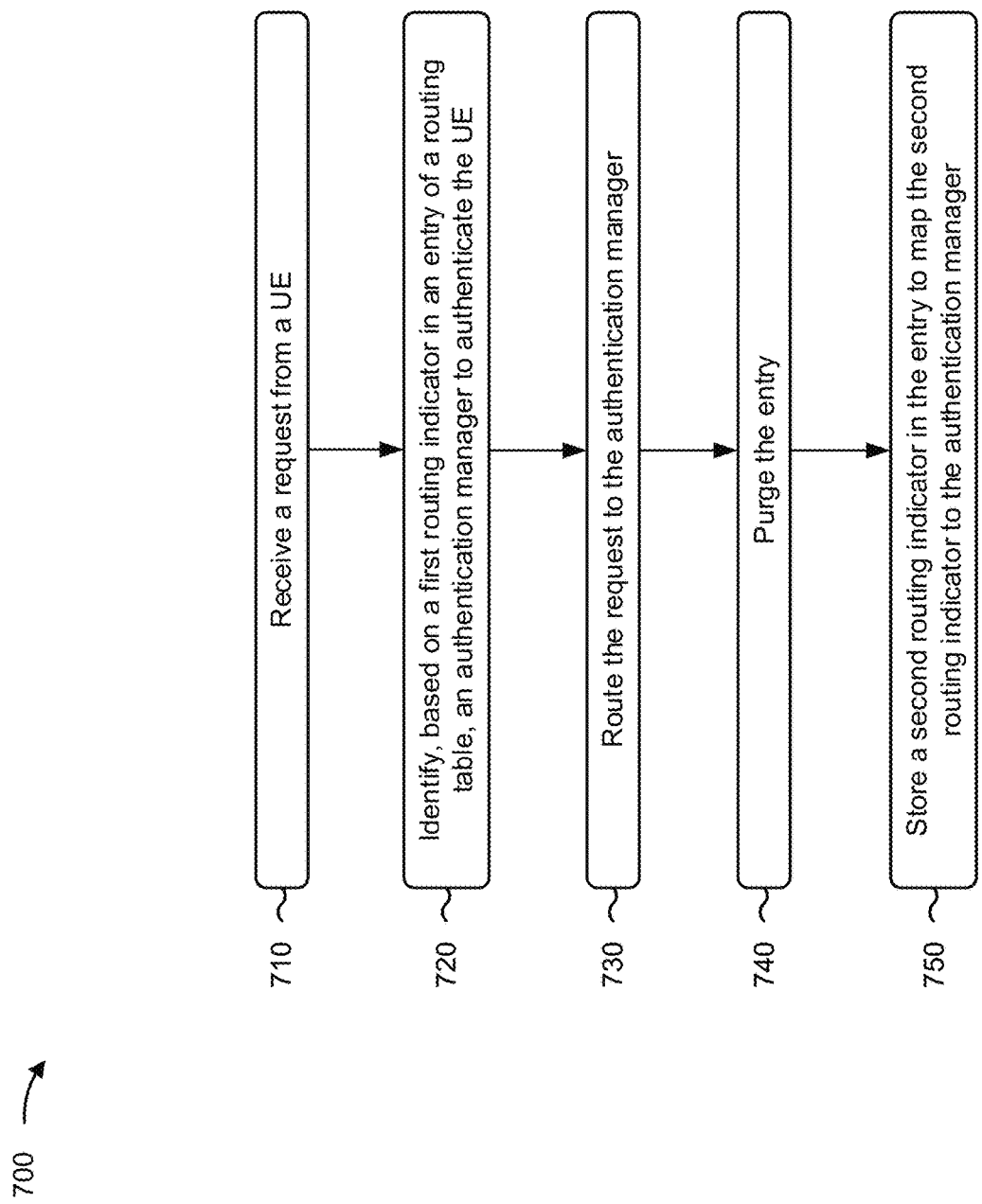
FIG. 7 is a flowchart of an example process relating to using a unique routing indicator to connect to a network.

FIG. 7 is a flowchart of an example process 700 associated with systems and methods for using a unique routing indicator to connect to a network. In some implementations, one or more process blocks of FIG. 7 may be performed by a core network component (e.g., one or more of the components of core network 115). In some implementations, one or more process blocks of FIG. 7 may be performed by another device or a group of devices separate from or including the core network component, such as a UE (e.g., UE 105), a base station of a RAN (e.g., RAN 502), a device of a data network (e.g., data network 504), and/or the like. Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include receiving a request from a UE (block 710). For example, the core network component may receive, from a UE, a request associated with enabling the UE to access a network, wherein the request includes a first routing indicator, as described above.

The request may correspond to at least one of: an activation request associated with the UE activating a subscription to the network, or a registration request associated with the UE connecting to the network. The network may be a 5G/NR network and the authentication manager may include an SIDF of the 5G/NR network.

As further shown in FIG. 7, process 700 may include identifying, based on a first routing indicator in an entry of a routing table, an authentication manager to identify and authenticate the UE (block 720). For example, the core network component may identify an authentication manager, of the network, that is mapped to the first routing indicator in an entry of a routing table of the network, as described above.

As further shown in FIG. 7, process 700 may include routing the request to the authentication manager (block 730). For example, the core network component may route the request to the authentication manager of the network to permit the authentication manager to identify and authenticate the UE, as described above.

As further shown in FIG. 7, process 700 may include purging the entry (block 740). For example, the core network component may purge, based on the request being routed to the authentication manager, the entry to remove the first routing indicator from the routing table, as described above. The core network component may purge the entry by clearing the first routing indicator from the entry to permit the authentication manager to be mapped to the second routing indicator via the entry.

As further shown in FIG. 7, process 700 may include store, after purging the entry, a second routing indicator in the entry to map the second routing indicator to the authentication manager, wherein the second routing indicator is different from the first routing indicator (block 750). For example, the core network component may store, after purging the entry, a second routing indicator in the entry to map the second routing indicator to the authentication manager, wherein the second routing indicator is different from the first routing indicator, as described above.

The authentication manager may be a first authentication manager and the entry may be a first entry. In some implementations, process 700 includes receiving, from the authentication manager, a derivative key and a SUPI of the UE, wherein the derivative key is based on de-concealing the SUPI to authenticate the UE; generating, based on the derivative key and the SUPI, a new routing indicator associated with the UE; selecting, from a plurality of authentication managers of the network, a second authentication manager for a subsequent authentication of the UE; and storing, in a second entry of the routing table, the new routing indicator in association with an identifier of the second authentication manager.

The request may be a first request. In some implementations, process 700 includes receiving, from the UE, a second request that includes the new routing indicator, wherein the new routing indicator is based on the UE being identified by the SUPI and the derivative key being generated from the SUPI; routing, based on the second entry, the second request to the second authentication manager to permit the second authentication manager to identify and authenticate the UE; and purging the second entry to remove the new routing indicator from the routing table, to permit the UE to send a third request that includes another routing indicator that is different from the first routing indicator and the new routing indicator.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
routing, by a first device, a first request to a first authentication manager to authenticate a second device;
receiving, by the first device and from the first authentication manager, a derivative key and a subscription permanent identifier (SUPI) of the second device;
generating, by the first device and based on the derivative key and the SUPI, a routing indicator associated with the second device;
selecting, by the first device, a second authentication manager for another authentication of the second device; and
storing, by the first device, information associating the routing indicator to the second authentication manager for routing a second request.

2. The method of claim 1, wherein the first authentication manager is identified based on a mapping of the first authentication manager to a first routing indicator associated with the first request.

3. The method of claim 1, wherein the derivative key is generated based on the SUPI.

4. The method of claim 1, wherein the first authentication manager and the second authentication manager are part of a 5th generation New Radio (5G/NR) network.

5. The method of claim 1, wherein the first request includes at least one of:
an activation request associated with activating a subscription of the first device, or
a registration request associated with connecting the first device to a network.

6. The method of claim 1, wherein the first request includes at least one of:
a first routing indicator associated with the first request, wherein the first authentication manager is identified based on a mapping of the first authentication manager to the first routing indicator, or
a subscription concealed identifier (SUCI).

7. The method of claim 1, further comprising:
decrypting a subscription concealed identifier (SUCI) associated with the first request to identify the SUPI.

8. A first device, comprising:
one or more processors configured to:
route a first request to a first authentication manager to authenticate a second device;
receive, from the first authentication manager, a derivative key and a subscription permanent identifier (SUPI) of the second device;
generate, based on the derivative key and the SUPI, a routing indicator associated with the second device;
select a second authentication manager for another authentication of the second device; and
store information associating the routing indicator to the second authentication manager for routing a second request.

9. The first device of claim 8, wherein the first authentication manager is identified based on a mapping of the first authentication manager to a first routing indicator associated with the first request.

10. The first device of claim 8, wherein the derivative key is generated based on the SUPI.

11. The first device of claim 8, wherein the first authentication manager and the second authentication manager are part of a 5th generation New Radio (5G/NR) network.

12. The first device of claim 8, wherein the first request includes at least one of:

an activation request associated with activating a subscription of the first device, or a registration request associated with connecting the first device to a network.

13. The first device of claim 8, wherein the first request includes at least one of:

a first routing indicator associated with the first request, wherein the first authentication manager is identified based on a mapping of the first authentication manager to the first routing indicator, or a subscription concealed identifier (SUCI).

14. The first device of claim 8, wherein the one or more processors are further configured to:

decrypt a subscription concealed identifier (SUCI) associated with the first request to identify the SUPI.

15. A non-transitory computer-readable medium storing a set of instructions, the set of instructions comprising:

one or more instructions that, when executed by one or more processors of a first device, cause the first device to:

route a first request to a first authentication manager to authenticate a second device;

receive, from the first authentication manager, a derivative key and a subscription permanent identifier (SUPI) of the second device;

generate, based on the derivative key and the SUPI, a routing indicator associated with the second device;

select a second authentication manager for another authentication of the second device; and store information associating the routing indicator to the second authentication manager for routing a second request.

16. The non-transitory computer-readable medium of claim 15, wherein the first authentication manager is identified based on a mapping of the first authentication manager to a first routing indicator associated with the first request.

17. The non-transitory computer-readable medium of claim 15, wherein the derivative key is generated based on the SUPI.

18. The non-transitory computer-readable medium of claim 15, wherein the first authentication manager and the second authentication manager are part of a 5th generation New Radio (5G/NR) network.

19. The non-transitory computer-readable medium of claim 15, wherein the first request includes at least one of:

an activation request associated with activating a subscription of the first device, or a registration request associated with connecting the first device to a network.

20. The non-transitory computer-readable medium of claim 15, wherein the one or more instructions further cause the first device to:

decrypt a subscription concealed identifier (SUCI) associated with the first request to identify the SUPI.

* * * * *